US012586227B1

(12) United States Patent
Liu et al.

(10) Patent No.: US 12,586,227 B1
(45) Date of Patent: Mar. 24, 2026

(54) THREE-DIMENSIONAL MEASUREMENT METHOD AND SYSTEM FOR KEY MORPHOLOGICAL FEATURE ON AIRCRAFT SURFACE, AND METHOD FOR USING SYSTEM

(71) Applicant: CHENGDU AIRCRAFT INDUSTRIAL (GROUP) CO., LTD., Chengdu (CN)

(72) Inventors: Shuntao Liu, Chengdu (CN); Ying Xie, Chengdu (CN); Long Yu, Chengdu (CN); Jing Xu, Chengdu (CN); Jie Li, Chengdu (CN); Zhihu Li, Chengdu (CN); Liya Han, Chengdu (CN); Chun Liu, Chengdu (CN); Hongyu Chen, Chengdu (CN); Hao Shen, Chengdu (CN); Jianchao Fu, Chengdu (CN); Long Hao, Chengdu (CN); Changle Tian, Chengdu (CN)

(73) Assignee: CHENGDU AIRCRAFT INDUSTRIAL (GROUP) CO., LTD., Chengdu (CN)

( * ) Notice: Subject to any disclaimer, the term of this patent is extended or adjusted under 35 U.S.C. 154(b) by 0 days.

(21) Appl. No.: 19/252,353

(22) Filed: Jun. 27, 2025

Related U.S. Application Data

(63) Continuation of application No. PCT/CN2023/134266, filed on Nov. 27, 2023.

(30) Foreign Application Priority Data

Nov. 9, 2023 (CN) .......................... 202311488337.7

(51) Int. Cl.
*G06T 7/60* (2017.01)
*G06T 7/13* (2017.01)

(52) U.S. Cl.
CPC ................. *G06T 7/60* (2013.01); *G06T 7/13* (2017.01); *G06T 2207/10028* (2013.01)

(58) Field of Classification Search
CPC .... G06T 7/60; G06T 7/13; G06T 2207/10028
See application file for complete search history.

(56) References Cited

U.S. PATENT DOCUMENTS 8,836,730 B1 * 9/2014 Desai ..................... H04N 7/185
345/660
2009/0151454 A1 6/2009 Georgeson et al.
(Continued)

FOREIGN PATENT DOCUMENTS

CN 106705847 A 5/2017
CN 107462184 A 12/2017
(Continued)

OTHER PUBLICATIONS

Wen et al., "Research on a high-precision extraction algorithm for aircraft skin seam features", Measurement 211 (2023) 112626, Feb. 24, 2023 (Year: 2023).*
(Continued)

*Primary Examiner* — Qian Yang
(74) *Attorney, Agent, or Firm* — Westbridge IP LLC

(57) ABSTRACT

Disclosed are a three-dimensional measurement method for the key morphological features on an aircraft surface, a three-dimensional measurement system for the key morphological features on the aircraft surface, and a method for using the three-dimensional measurement system. In this method, the distribution characteristics of point clouds are fully utilized, and an angle is formed between a direction vector of the measurement point and a seam direction, which ensures that the point clouds can gradually approach the actual edge of the seam, and eliminates the impact of randomness. The point nearest to the seam in the point clouds on both sides of the seam is selected as the nearest (Continued)

planning three-dimensional measurement points according to information of the rivet and the seam in the aircraft digital model, so that the direction vector of the measurement point forms an angle with the seam direction. At the measurement point, a structured light measurement device is used for measurement to obtain a two-dimensional image and three-dimensional point cloud of the aircraft surface. The structured light measurement device can adopt a conventional structure in the art, including an industrial camera and a multi-line structured light emitter
↘ S1 automatically identifying and extracting the position information of rivets and seams in the two-dimensional image, obtaining the point cloud corresponding to the rivet and the seam according to the correspondence between the two-dimensional image and the three-dimensional point cloud, and calculating a concave-convex amount on the rivet, and a flush and a gap of the seam
↗ S2 point, which overcomes the limitation of the density of the point cloud, so that the distance between the selected nearest point and the actual edge of the seam is greatly reduced.

16 Claims, 7 Drawing Sheets

(56) References Cited

U.S. PATENT DOCUMENTS

| | | | |
|---|---|---|---|
| 2014/0368614 A1* | 12/2014 | Imai | G01B 21/047 |
| | | | 348/47 |
| 2022/0122317 A1 | 4/2022 | Wand et al. | |
| 2022/0234719 A1 | 7/2022 | Kleshchev et al. | |

FOREIGN PATENT DOCUMENTS

| | | | |
|---|---|---|---|
| CN | 109506580 A | | 3/2019 |
| CN | 111062960 A | | 4/2020 |
| CN | 111524129 A | | 8/2020 |
| CN | 111814888 A | | 10/2020 |
| CN | 109520921 | * | 12/2020 |
| CN | 112053361 A | | 12/2020 |
| CN | 113624142 A | | 11/2021 |
| CN | 114627177 A | | 6/2022 |
| CN | 114791270 A | | 7/2022 |
| CN | 115597512 A | | 1/2023 |
| CN | 116358449 A | | 6/2023 |
| CN | 116842634 A | | 10/2023 |
| DE | 102015115763 A1 | | 3/2016 |
| EP | 0845656 A1 | | 6/1998 |
| JP | 2015004389 A | | 1/2015 |

OTHER PUBLICATIONS

Machine translation for CN 116358449, IDS (Year: 2023).*
Machine translation for CN 109520921 (Year: 2020).*
International Search Report and Written Opinion issued in corresponding PCT Application No. PCT/CN2023/134266, dated Aug. 1, 2024.
Notification to Grant Patent Right for Invention issued in counterpart Chinese Patent Application No. 202311488337.7, dated Jan. 2, 2024.
Wang et al., Aircraft Large-Scale Automation Flexible Measurement Technology, Journal of Nanjing University of Aeronautics & Astronautics, vol. 52, No. 3, pp. 353-359, dated Jun. 15, 2020.
Yang et al., An Overall Shape Measurement Method for Large Components Based on Fusion of The Optic-Electrical Scanning and Positioning, Infrared and Laser Engineering, vol. 48, No. 5, pp. 1-8, dated May 25, 2019.

* cited by examiner

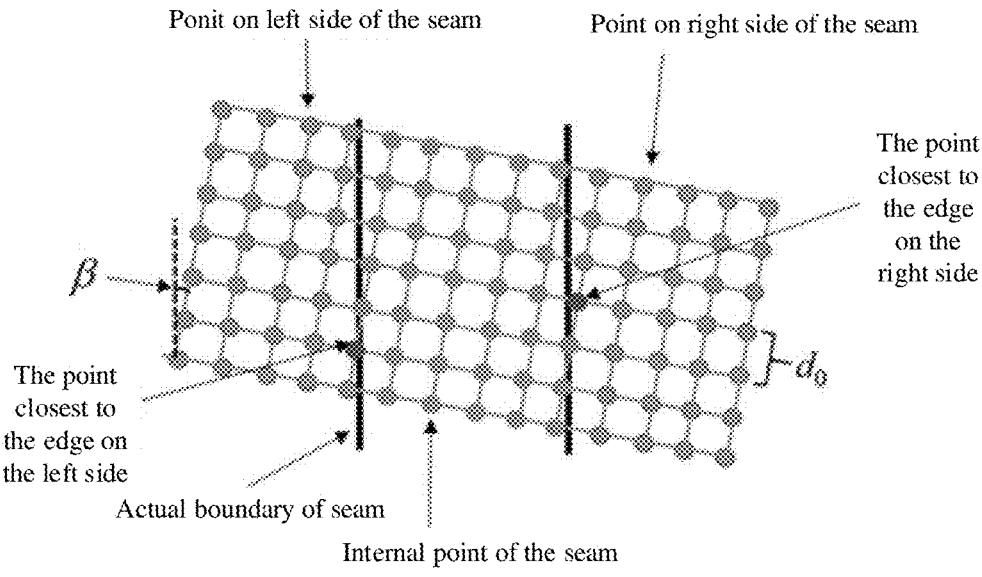

FIG. 1 planning three-dimensional measurement points according to information of the rivet and the seam in the aircraft digital model, so that the direction vector of the measurement point forms an angle with the seam direction. At the measurement point, a structured light measurement device is used for measurement to obtain a two-dimensional image and three-dimensional point cloud of the aircraft surface. The structured light measurement device can adopt a conventional structure in the art, including an industrial camera and a multi-line structured light emitter     S1 automatically identifying and extracting the position information of rivets and seams in the two-dimensional image, obtaining the point cloud corresponding to the rivet and the seam according to the correspondence between the two-dimensional image and the three-dimensional point cloud, and calculating a concave-convex amount on the rivet, and a flush and a gap of the seam     S2

FIG. 2 according to the collected two-dimensional image, obtaining two edge lines of the seam, and extending the two edge lines outward respectively by a distance $l_3$ to obtain two image subregions of the seam

S221 according to the correspondence between the two-dimensional image and the three-dimensional point cloud, obtaining the point cloud set $\Omega_3$ and the point cloud set $\Omega_4$ corresponding to the two image subregions of the seam

S222 calculating the shortest distance between the point clouds in the point cloud set $\Omega_3$ and the point clouds in the point cloud set $\Omega_4$ in the x direction, calculating the x coordinate $x_1$ of the point with the largest x coordinate in the point cloud set $\Omega_3$ on the left side of the seam and the x coordinate $x_2$ of the point with the smallest x coordinate in the point cloud set $\Omega_4$ on the right side of the seam, then the method for calculating the gap of the seam is $d_i=x_2-x_1$

S223

FIG. 3 according to the collected two-dimensional image, obtaining two edge lines of the seam, and extending the two edge lines outward respectively by a distance of $l_3$ to obtain two image subareas of the seam

S231 according to the correspondence between the two-dimensional image and the three-dimensional point cloud, obtaining the point cloud set $\Omega_3$ and the point cloud set $\Omega_4$ corresponding to the two image subregions of the seam

S232 performing plane fitting on all points in the point cloud set $\Omega_3$, obtaining the plane, calculating the distances from all points in the point cloud set $\Omega_4$ to the plane and averaging the distances to obtain the flush $\varepsilon_i$ of the seam. $\varepsilon_i$ is the flush of the seam at the i-th sampling point

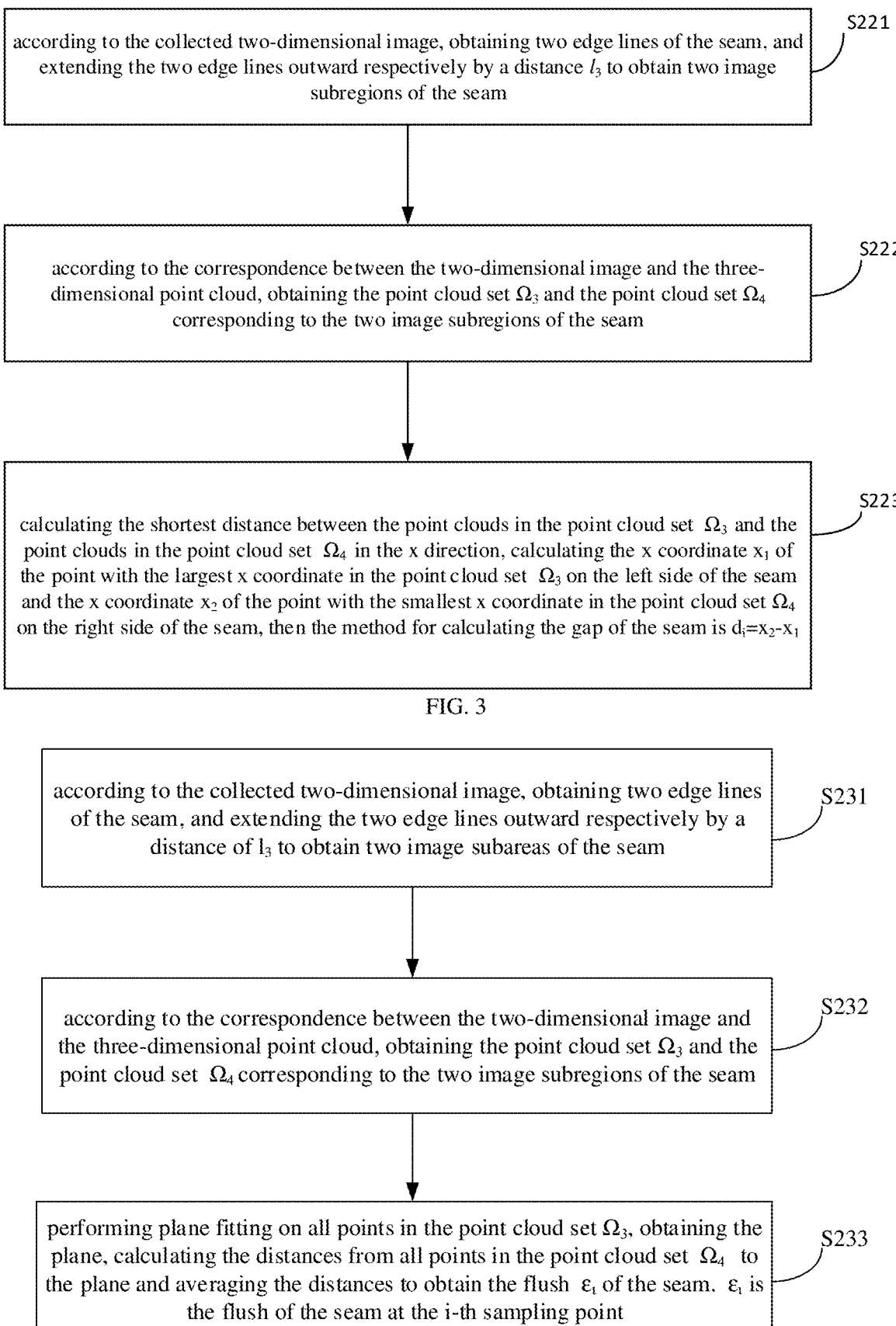

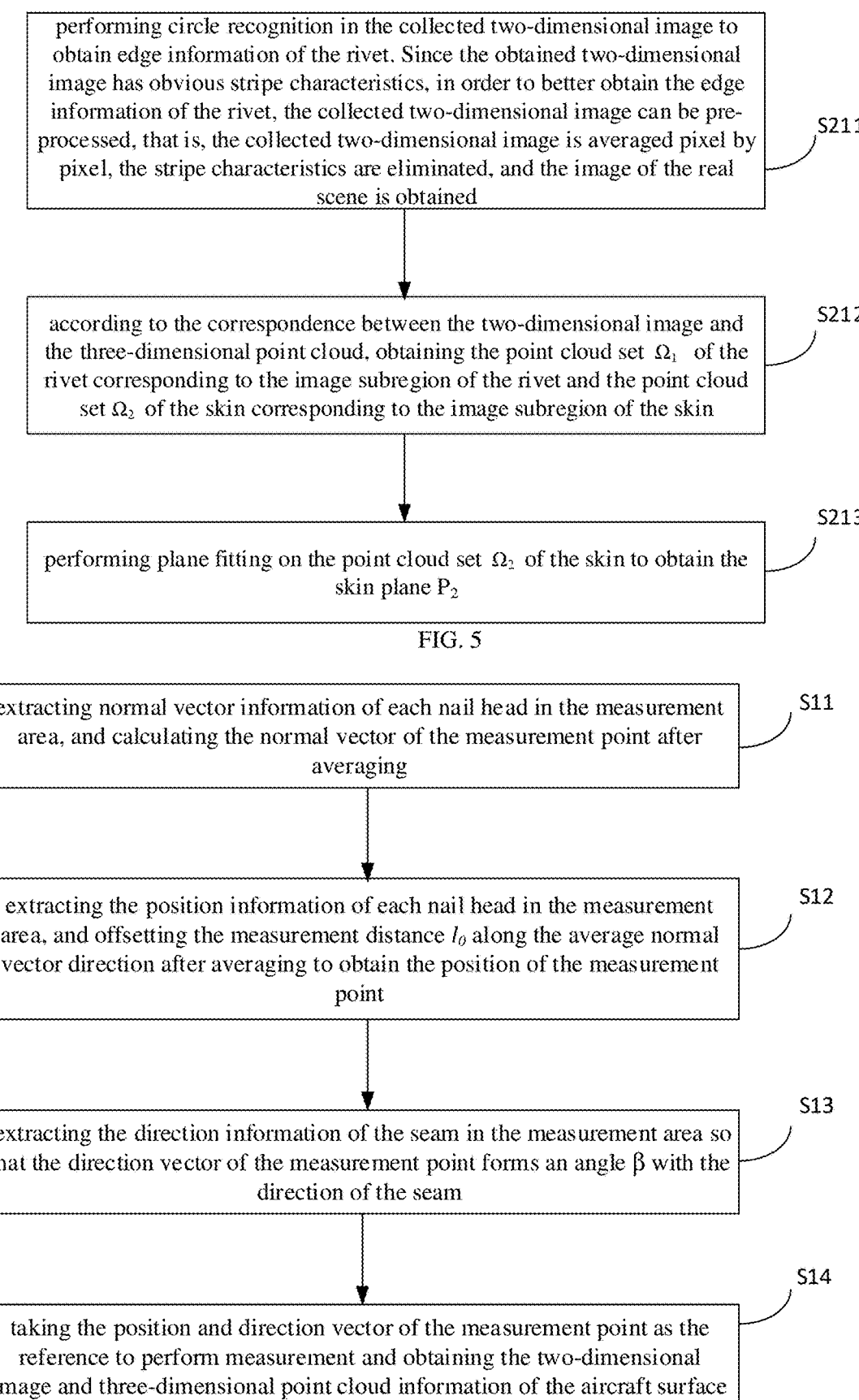

performing circle recognition in the collected two-dimensional image to obtain edge information of the rivet. Since the obtained two-dimensional image has obvious stripe characteristics, in order to better obtain the edge information of the rivet, the collected two-dimensional image can be pre-processed, that is, the collected two-dimensional image is averaged pixel by pixel, the stripe characteristics are eliminated, and the image of the real scene is obtained

S211 according to the correspondence between the two-dimensional image and the three-dimensional point cloud, obtaining the point cloud set $\Omega_1$ of the rivet corresponding to the image subregion of the rivet and the point cloud set $\Omega_2$ of the skin corresponding to the image subregion of the skin

S212 performing plane fitting on the point cloud set $\Omega_2$ of the skin to obtain the skin plane $P_2$

S213

FIG. 5 extracting normal vector information of each nail head in the measurement area, and calculating the normal vector of the measurement point after averaging

S11 extracting the position information of each nail head in the measurement area, and offsetting the measurement distance $l_0$ along the average normal vector direction after averaging to obtain the position of the measurement point

S12 extracting the direction information of the seam in the measurement area so that the direction vector of the measurement point forms an angle $\beta$ with the direction of the seam

S13 taking the position and direction vector of the measurement point as the reference to perform measurement and obtaining the two-dimensional image and three-dimensional point cloud information of the aircraft surface

THREE-DIMENSIONAL MEASUREMENT METHOD AND SYSTEM FOR KEY MORPHOLOGICAL FEATURE ON AIRCRAFT SURFACE, AND METHOD FOR USING SYSTEM

CROSS-REFERENCE TO RELATED APPLICATIONS

This application is a continuation of International Application No. PCT/CN2023/134266, filed on Nov. 27, 2023, which claims priority to Chinese Patent Application No. 202311488337.7, filed on Nov. 9, 2023. The disclosures of the above-mentioned applications are incorporated herein by reference.

TECHNICAL FIELD

The present application relates to the technical field of digital measurement, and in particular to a three-dimensional measurement method and system for a key morphological feature on an aircraft surface, and a method for using the system.

BACKGROUND

For advanced aircraft manufacturing, aircraft surface quality is crucial to achieving the key performance indicators of the aircraft. This quality is ensured by measuring the key morphological features of the aircraft surface, including the concave and convex amount of the nail head, step and gap between panels, etc. At present, the key morphological features of the aircraft surface is still mainly measured manually using methods such as micrometer pads, feeler gauges, visual inspection and hand touch, etc. The test results are highly subjective and uncertain, and cannot guarantee the high requirements of advanced aircraft for surface quality. In addition, the manual method of detection is inefficient and cannot meet the needs of mass production of advanced aircraft.

In addition, although structured light can be used to automatically obtain the three-dimensional point cloud of the aircraft surface, there is still a lack of methods for extracting and calculating key morphological features, which hinders the widespread application of automated measurement.

In the related art, Chinese Application Publication CN114626470A, published on Jun. 14, 2022, proposed a technical solution as follows: the corresponding seam gap is calculated using the directed distance D from each point on one of the two curves of the seam contour to the other curve. This technical solution cannot reduce the error caused by insufficient point cloud density.

In the related art, Chinese Application Publication CN111028221A, published on Apr. 17, 2020, also proposed a technical solution as follows: the feature lines are fitted using the feature points of the seams, and the gap and step difference between the seams are calculated according to the spatial position relationship of the feature lines of the seams. However, since point clouds are discrete, the feature points of the seams used to fit the feature lines are a certain distance away from the actual edge of the seams, which makes the final gap measurement result larger.

In the related art, Chinese Application Publication CN111814888A, published on Oct. 23, 2020, also proposed a technical solution as follows: T-Scan is used to scan the seam and the edge critical point is used to calculate the gap step difference of the seam. However, the distance from the edge critical point to the actual seam edge is random and is less than or equal to the distance between adjacent points in the point cloud.

In the related art, Chinese Application Publication CN112053361A, published on Dec. 8, 2020, also proposed a technical solution as follows: the single-sided gap is defined as the distance from the boundary point on one side to the auxiliary straight line on the opposite side. However, due to the density of the point cloud, there is a certain distance between the boundary point and the actual edge of the seam, resulting in errors in the gap measurement.

In the related art, Chinese Application Publication CN114627177A, published on Jun. 14, 2022, also proposed a technical solution as follows: the step height and gap width are calculated using the segment endpoints, but because the segment endpoints are subject to the density of the point cloud, it is difficult to ensure their distance from the actual seam edge.

None of the above technical solutions can overcome the limitation of point cloud density and reduce the error caused by insufficient point cloud density, resulting in large errors in gap measurement.

Furthermore, with the development of automated measurement technology, three-dimensional measurement technologies such as surface structured light have gradually entered the field of aviation manufacturing and have been applied to the measurement of aircraft surface quality. The surface of an aircraft is divided into an outer surface and an inner surface. The outer surface has a relatively large area. In order to improve the measurement efficiency, a larger measurement area is required, so the structured light measurement system is required to have a longer measurement distance. However, for inner surfaces with narrow internal space, the structured light measurement system must have a smaller measurement distance to smoothly enter the inner surface such as an air inlet for measurement. However, the measurement distance of the existing structured light measurement system is fixed and cannot simultaneously meet the different measurement distance requirements of the outer and inner surfaces of the aircraft. Therefore, it is urgent to develop a structured light three-dimensional measurement system with a variable measurement distance.

SUMMARY

To solve the above technical problems, the present application proposes a three-dimensional measurement method and system for the key morphological feature on the aircraft surface, and a method for using the system. This measurement method makes full use of the distribution characteristics of point clouds, forms an angle between the direction vector of the measurement point and the direction of the seam, ensures that the point cloud can gradually approach the edge of the actual seam, remove the influence of randomness, and enable the selection of the closest point to the actual edge of the seam in the point clouds on both sides of the seam. This overcomes the limitation of the density of the point cloud, and greatly reduces the distance from the selected closest point to the actual edge of the seam, thereby greatly reducing the error of gap measurement and the error caused by insufficient density of the point cloud. The measuring distance of the measuring system is variable, and can meet different requirements for measuring distance when performing three-dimensional measurement on the inner and outer surfaces of an aircraft.

The present application is realized by adopting the following technical solution.

A three-dimensional measurement method for a key morphological feature on an aircraft surface, including:

step S1, planning a three-dimensional measurement point according to information of a rivet and a seam in an aircraft digital model, and obtaining information of a two-dimensional image and a three-dimensional point cloud of the aircraft surface, a direction vector of the measurement point forms an angle $\beta$ with a seam direction; and step S2, automatically identifying and extracting position information of the rivet and the seam in the two-dimensional image, and obtaining point clouds corresponding to the rivet and the seam by using correspondence between the two-dimensional image and the three-dimensional point cloud to calculate a concave-convex amount on the rivet, and a gap and a flush of the seam, a method for calculating the gap of the seam includes:

finding a nearest point in point clouds on both sides of the seam in a direction perpendicular to the seam to obtain the gap of the seam.

In an embodiment, the method for calculating the gap of the seam in the step S2 includes:

step S221, obtaining two edge lines of the seam according to a collected two-dimensional image, and extending the two edge lines outward by a distance of $l_3$ to obtain two image subregions of the seam;

step S222, obtaining a point cloud set $\Omega_3$ and a point cloud set $\Omega_4$ corresponding to the two image subregions of the seam according to the correspondence between the two-dimensional image and the three-dimensional point cloud; and step S223, calculating a shortest distance between a point cloud in the point cloud set $\Omega_3$ and a point cloud in the point cloud set $\Omega_4$ in an x direction to calculate the gap of the seam, the x direction is a direction perpendicular to the seam.

In an embodiment, the step S223 includes:

taking an x coordinate $x_1$ of a point with a largest x coordinate in the point cloud set $\Omega_3$ on a left side of the seam and an x coordinate $x_2$ of a point with a smallest x coordinate in the point cloud set $\Omega_4$ on a right side of the seam, then the method for calculating the gap of the seam is as follows:

$$d_i = x_2 - x_1;$$

where $d_i$ is the gap of the seam at an i-th sampling point.

In an embodiment, the step S223 includes:

dividing the point cloud set $\Omega_3$ and the point cloud set $\Omega_4$ every distance of $l_4$ to generate a point cloud subset $\Omega_3{}^i$, $i=1, 2, \ldots, m$ and a point cloud subset $\Omega_4{}^i$, $i=1, 2, \ldots, m$, where m is a number of subsets contained in the point cloud set $\Omega_3$ and the point cloud set $\Omega_4$; and calculating a shortest distance between a point cloud in the point cloud subset $\Omega_3{}^i$ and a point cloud in the point cloud subset $\Omega_4{}^i$ in an x direction, that is, taking an x coordinate $x_1$ of a point with a largest x coordinate in the point cloud subset $\Omega_3{}^i$ on a left side of the seam and an x coordinate $x_2$ of a point with a smallest x coordinate in the point cloud subset $\Omega_4{}^i$ on a right side of the seam, then the method for calculating the gap of the seam gap is as follows:

$$d_i = x_2 - x_1;$$

where $d_i$ is the gap of the seam at an i-th sampling point;

repeating above steps for all subsets in the point cloud set $\Omega_3$ and the point cloud set $\Omega_4$ to obtain m gaps of the seams.

In an embodiment, a method for calculating the flush of the seam includes:

step S231, obtaining two edge lines of the seam according to a collected two-dimensional image, and extending the two edge lines outward by a distance of $l_3$ to obtain two image subregions of the seam;

step S232, obtaining a point cloud set $\Omega_3$ and a point cloud set $\Omega_4$ corresponding to the two image subregions of the seam according to the correspondence between the two-dimensional image and the three-dimensional point cloud; and step S233, performing plane fitting on all points in the point cloud set $\Omega_3$ to obtain a plane, calculating distances from all points in the point cloud set $\Omega_4$ to the plane and averaging the distances to obtain the flush $\varepsilon_i$ of the seam, where $\varepsilon_i$ is the flush of the seam at an i-th sampling point.

In an embodiment, the step S233 includes:

dividing the point cloud set $\Omega_3$ and the point cloud set $\Omega_4$ every distance of $l_4$ to generate a point cloud subset $\Omega_3{}^i$, $i=1, 2, \ldots, m$ and a point cloud subset $\Omega_4{}^i$, $i=1, 2, \ldots, m$, where m is a number of subsets contained in the point cloud set $\Omega_3$ and the point cloud set $\Omega_4$;

performing plane fitting on all points in the point cloud subset $\Omega_3{}^i$ to obtain a plane $P_2$, an equation for the plane $P_2$ is recorded as $A_2 x + B_2 y + C_2 z + D_2 = 0$, and calculating distances from all points in the point cloud subset $\Omega_4{}^i$ to the plane $P_2$ and averaging the distances to obtain the flush $\varepsilon_i$ of the seam, where $\varepsilon_i$ is the flush of the seam at the i-th sampling point, and $A_2$, $B_2$, $C_2$ and $D_2$ are coefficients of the equation of the plane respectively; and repeating above steps for all subsets in the point cloud set $\Omega_3$ and the point cloud set $\Omega_4$ to obtain m flushes $\varepsilon_i$, $i=1, 2, \ldots, m$ of the seam.

In an embodiment, the distance $l_4$ is greater than $$\frac{d_0}{\sin\beta},$$

where $d_0$ is a distance between adjacent points of the point clouds for measurement, and $\beta$ is an angle formed by a direction vector of a point for measurement and a seam direction.

In an embodiment, the step S2 further includes:

preprocessing the two-dimensional image, that is, averaging the collected two-dimensional image pixel-by-pixel.

In an embodiment, obtaining the two edge lines of the seam includes:

using a Canny operator to perform edge detection to obtain edge information of the seam; using length and continuity to screen, and performing straight line fitting to obtain the two edge lines of the seam.

In an embodiment, the step S1 includes:

step S11, extracting normal vector information of each nail head in a measurement area, and calculating a normal vector of a measurement point after averaging;

step S12, extracting position information of each nail head in the measurement area, and offsetting a measurement distance of $l_0$ along an average normal vector direction after averaging to obtain a position of the measurement point;

step S13, extracting direction information of the seam in the measurement area, so that a direction vector of the measurement point forms an angle β with a seam direction; and step S14, taking the position and direction vector of the measurement point as a reference, perform measurement to obtain information of the two-dimensional image and the three-dimensional point cloud of the aircraft surface.

In an embodiment, the method for calculating the concave-convex amount on the rivet in the step S2 includes:

step S211, performing circle recognition in the collected two-dimensional image to obtain edge information of the rivet, performing ellipse fitting on the rivet edge and extending the rivet edge inward by a distance of $l_1$ to obtain an image subregion of the rivet, and extending a result of the ellipse fitting of the rivet edge outward by a distance of $l_2$ to obtain an image subregion of a skin;

step S212, according to the correspondence between the two-dimensional image and the three-dimensional point cloud, obtaining a rivet point cloud set $\Omega_1$ corresponding to the image subregion of the rivet and a skin point cloud set $\Omega_2$ corresponding to the image subregion of the skin; and step S213, performing plane fitting on the skin point cloud set $\Omega_2$ to obtain a skin plane $P_1$, an equation of the skin plane is $A_1x+B_1y+C_1z+D_1=0$, then the method for calculating the concave-convex on the rivet is as follows:

$$\delta = \frac{\sum_{i=1}^{n} A_1 x_i + B_1 y_i + C_1 z_i + D_1}{n\sqrt{A_1^2 + B_1^2 + C_1^2}},$$

where $(x_i, y_i, z_i)$, i=1, 2, . . . , n is a point cloud coordinate, n is a total number of point clouds in the rivet point cloud set, $A_1$, $B_1$, $C_1$ and $D_1$ are coefficients of the equation of the plane, and δ is the concave-convex on the rivet.

In addition, the present application also proposes a three-dimensional measurement system for a key morphological feature on an aircraft surface, applied to the three-dimensional measurement method for the key morphological feature on the aircraft surface as described above to obtain information of a two-dimensional image and a three-dimensional point cloud of the aircraft surface, and the measurement system includes:

a camera;

a projector; and a drive component configured to drive the camera and the projector to rotate in opposite directions at a same angle simultaneously, to increase or decrease a measurement distance, a center of a measurement range is always located on a perpendicular bisector of a line connecting optical centers of the camera and the projector.

In an embodiment, the drive component includes a camera gear, a projector gear, a camera rack, a projector rack and a drive gear; the camera and the projector are respectively provided at the camera gear and the projector gear; the camera gear, the projector gear and the drive gear have a same radius; the camera rack comprises a first rack for meshing with the camera gear and a second rack for meshing with the drive gear; the projector rack comprises a third rack for meshing with the projector gear and a fourth rack for meshing with the drive gear; and the drive gear rotates to simultaneously drive the second rack and the fourth rack to move in an opposite direction, to further drive the camera gear and the projector gear to rotate in an opposite direction at a same angle simultaneously, thereby driving the camera and the projector to rotate in an opposite direction at a same angle simultaneously, for adjusting a measurement distance.

In an embodiment, initially, angles between optical axes of the camera and the projector and a horizontal direction are the same.

In an embodiment, angle encoders are installed on the camera gear and the projector gear.

In an embodiment, lenses installed on the camera and the projector are both mechanical zoom lenses.

In addition, the present application also proposes a method for using the three-dimensional measurement system for the key morphological feature on the aircraft surface as described above, when measuring an exterior of an aircraft, a camera and a projector are driven to rotate in directions away from each other simultaneously to increase a measurement distance; when measuring a narrow space inside the aircraft, the camera and the projector are driven to rotate in directions close to each other simultaneously to reduce a measurement distance.

Compared with the related art, the beneficial effects of the present application are as follows.

Firstly, in the present application, a method for automatically identifying and extracting key morphological features of an aircraft surface by combining two-dimensional and three-dimensional information is proposed, which can automatically identify and extract the position information of rivets and seams in a two-dimensional image, obtain the point clouds corresponding to the rivets and seams by using the correspondence between the two-dimensional image and the three-dimensional point cloud, and calculate the convex-concave amount on the rivet, the flush and the gap of the seam, to realize the automatic detection for the quality of the aircraft surface. Due to the innovative method for extracting the rivet and seam that combines two-dimensional and three-dimensional information, the identification and extraction process has high efficiency and robustness.

Secondly, in the present application, a small deflection angle super-resolution method for improving the accuracy for measuring the gap of the seam is proposed. When measuring the point cloud, the measurement direction is offset from the seam direction by a small angle, and then the nearest point in the point cloud on both sides that is perpendicular to the seam is found to obtain the gap of the seam. This angle ensures that the point cloud can gradually approach the actual edge of the seam, and eliminates the influence of randomness, so that the distance from the nearest point to the actual edge of the seam is greatly reduced, thereby greatly reducing the error of the gap measurement. In the related art, the distance from the boundary point to the edge of the seam is highly random, and its fluctuation range is equal to the distance between adjacent points in the point clouds.

Through this method, the present application makes the accuracy for measuring the gap of the seam free from the limitation of the resolution of the point cloud for the first time, greatly improving the accuracy for measuring the gap of the seam.

Thirdly, in the present application, the ellipse fitting is performed on the edge of the rivet, and the edge of the rivet is extended inward by a distance $l_1$ to be used as the range of the rivet, which can avoid the influence of the pit and avoid causing large errors.

Fourthly, in the present application, the collected two-dimensional image is averaged pixel by pixel, which can eliminate the stripe feature, make the pixel value of the image more accurate, obtain the image of the real scene, and extract more accurate edge of the rivet and accurate edge of the seam.

Fifthly, this measurement system uses a gear rack structure to change the angle between the camera and the projector, thereby changing the measurement distance to meet the different requirements for the measurement distance of the inner and outer surfaces of the aircraft. In addition, the camera and the projector rotate in opposite directions at the same angle, which can ensure that the center of the measurement range is always located on the perpendicular bisector of the line connecting the optical centers of the camera and the projector, so that the measurement system does not need to consider the change of the measurement range when changing the measurement distance in actual application.

Angle encoders are installed on the camera gear and the projector gear to accurately record the rotation angle. The angle information can be used to calculate the external parameter matrix of the camera and the projector to avoid repeated calibration after each rotation angle.

Lastly, the measurement system of the present application, combined with a mechanical zoom lens, can automatically adjust the measurement distance to achieve automatic measurement of the internal and external surfaces of the aircraft.

The present application innovatively proposes a three-dimensional measurement method that changes the measurement distance by changing the angle between the camera and the projector. Using this measurement system, it is possible to adapt to the different needs of three-dimensional measurement of the internal and external surfaces of the aircraft and realize the acquisition of a complete point cloud of the aircraft surface.

BRIEF DESCRIPTION OF THE DRAWINGS

The present application will be further described in detail below in conjunction with accompanying drawings and specific embodiments.

FIG. 1 is a schematic diagram for measuring a point cloud of a seam according to the present application.

FIG. 2 is a schematic diagram of a process according to the present application.

FIG. 3 is a schematic diagram of a method for calculating a gap of the seam according to the present application.

FIG. 4 is a schematic diagram of the method for calculating a flush of the seam according to the present application.

FIG. 5 is a schematic diagram of the method for calculating a concave-convex amount on the rivet according to the present application.

FIG. 6 is a schematic diagram of the method for planning three-dimensional measurement points according to the nail head and seam information in the aircraft digital model according to the present application.

DETAILED DESCRIPTION OF THE EMBODIMENTS

Figure 7:
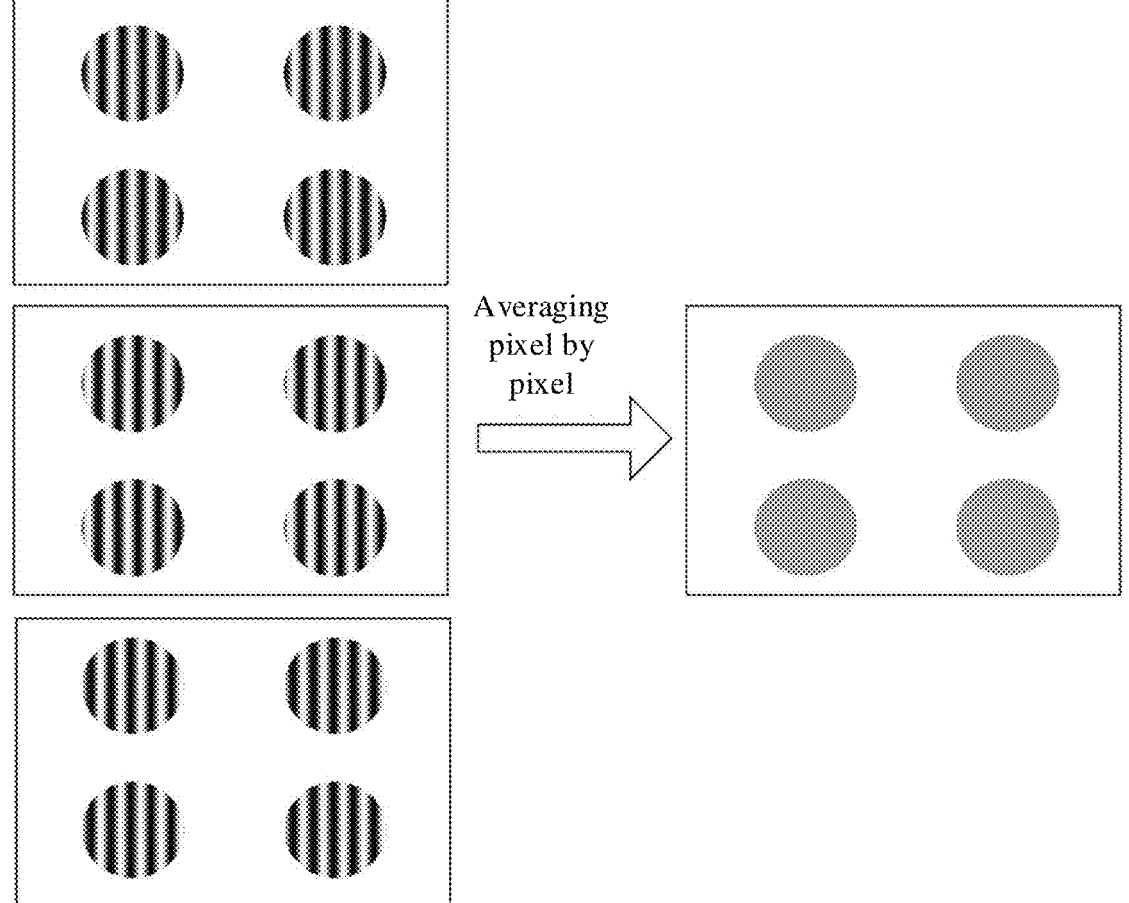
FIG. 7 is a schematic diagram of the process of obtaining average brightness of an image according to the present application.

As a basic embodiment of the present application, the present application includes a three-dimensional measurement method for key morphological features of an aircraft surface, as shown in FIG. 2, including the following steps.

Step S1, planning three-dimensional measurement points according to information of the rivet and the seam in the aircraft digital model, so that the direction vector of the measurement point forms an angle with the seam direction. At the measurement point, a structured light measurement device is used for measurement to obtain a two-dimensional image and three-dimensional point cloud of the aircraft surface. The structured light measurement device can adopt a conventional structure in the art, including an industrial camera and a multi-line structured light emitter.

Step S2, automatically identifying and extracting the position information of rivets and seams in the two-dimensional image, obtaining the point cloud corresponding to the rivet and the seam according to the correspondence between the two-dimensional image and the three-dimensional point cloud, and calculating a concave-convex amount on the rivet, and a flush and a gap of the seam.

For the automatic identification and extraction of the position information of rivets and seams, the method for calculating the concave-convex amount on the rivet and the flush of the seam, conventional technical means in the art can be used to complete, such as using a multi-level model fitting algorithm to extract contour features of the rivet and contour features of the seam, calculating the concave-convex amount on the rivet based on the extracted rivet contour features, and calculating the flush of the seam based on the seam contour features.

The method for calculating the gap of the seam includes: finding the nearest point in the point cloud on both sides of the seam in the direction perpendicular to the seam to obtain the gap of the seam. How to find the nearest point can be achieved by conventional technical means in the art.

As another embodiment of the present application, this embodiment is an elaboration of a specific embodiment for calculating the gap of the seam in step S2 based on the above embodiment.

In this embodiment, based on the two-dimensional image and three-dimensional point cloud of the aircraft surface obtained in the above step S1, as shown in FIG. 3, the method for calculating the gap of the seam includes the following steps.

Step S221, according to the collected two-dimensional image, obtaining two edge lines of the seam, and extending the two edge lines outward respectively by a distance $l_3$ to obtain two image subregions of the seam.

Step S222, according to the correspondence between the two-dimensional image and the three-dimensional point cloud, obtaining the point cloud set $\Omega_3$ and the point cloud set $\Omega_4$ corresponding to the two image subregions of the seam.

Step S223, calculating the shortest distance between the point clouds in the point cloud set $\Omega_3$ and the point clouds in the point cloud set $\Omega_4$ in the x direction, calculating the x coordinate $x_1$ of the point with the largest x coordinate in the point cloud set $\Omega_3$ on the left side of the seam and the x coordinate $x_2$ of the point with the smallest x coordinate in the point cloud set $\Omega_4$ on the right side of the seam, then the method for calculating the gap of the seam is $d_i=x_2-x_1$.

Where $d_i$ is the gap of the seam at the i-th sampling point, and the x direction is the direction perpendicular to the seam.

In this embodiment, since the direction vector of the measurement point is deflected by an angle with the seam direction, it is ensured that the point cloud can gradually approach the edge of the actual seam. Then, by selecting the point closest to the seam in the point cloud on both sides of the seam as the closest point, and calculating the difference in their coordinates perpendicular to the seam direction, errors caused by insufficient point cloud density can be greatly reduced.

As another embodiment of the present application, this embodiment is a further detailed supplement and explanation of the method for calculating the gap of the seam according to the present application based on the above-mentioned embodiments. In this embodiment, after obtaining the point cloud set $\Omega_3$ and the point cloud set $\Omega_4$ corresponding to the two image subregions of the seam, it is necessary to divide the point cloud set $\Omega_3$ and the point cloud set $\Omega_4$ at a distance of $l_4$ to generate the point cloud subset $\Omega_3{}^i$, i=1, 2, . . . , m and the point cloud subsets $\Omega_4{}^i$, i=1, 2, . . . , m, where m is the number of subsets contained in the point cloud set $\Omega_3$ and the point cloud set $\Omega_4$, and is also the number of sampling points.

By calculating the shortest distance between the point clouds in the point cloud subset $\Omega_3{}^i$ and the point clouds the point cloud subset $\Omega_4{}^i$ in the x direction, that is, calculating the x coordinate $x_1$ of the point with the largest x coordinate in the point cloud subset $\Omega_3{}^i$ on the left side of the seam and the x coordinate $x_2$ of the point with the smallest x coordinate in the point cloud subset $\Omega_4{}^i$ on the right side of the seam, the method for calculating the gap of the seam is:

$$d_i=x_2-x_1.$$

Where $d_i$ is the gap of the seam at the i-th sampling point.

The above steps for all subsets in the point cloud set $\Omega_3$ and the point cloud set $\Omega_4$ are repeated to obtain m gaps of the seams $d_i$, i=1, 2, . . . , m.

Since the length of the seam is long and the gaps at various locations vary greatly, this embodiment divides the point cloud sets on both sides of the seam, and can calculate the gaps of the seams at various locations, making the calculation of the gaps of the seams more accurate.

As another embodiment of the present application, this embodiment is a further detailed supplement and explanation of the method for calculating the flush of the seam based on the above-mentioned embodiments.

In this embodiment, as shown in FIG. 4, the method for calculating the flush of the seam includes:

Step S231, according to the collected two-dimensional image, obtaining two edge lines of the seam, and extending the two edge lines outward respectively by a distance of $l_3$ to obtain two image subareas of the seam.

Step S232, according to the correspondence between the two-dimensional image and the three-dimensional point cloud, obtaining the point cloud set $\Omega_3$ and the point cloud set $\Omega_4$ corresponding to the two image subregions of the seam.

Step S233, performing plane fitting on all points in the point cloud set $\Omega_3$, obtaining the plane, calculating the distances from all points in the point cloud set $\Omega_4$ to the plane and averaging the distances to obtain the flush $\varepsilon_i$ of the seam. $\varepsilon_i$ is the flush of the seam at the i-th sampling point. The plane fitting algorithm is a conventional technical means in the art and will not be repeated in this embodiment.

As another embodiment of the present application, this embodiment is a further detailed supplement and explanation of method of calculating the flush of the seam based on the above-mentioned embodiments. In this embodiment, after obtaining the point cloud set $\Omega_3$ and point cloud set $\Omega_4$ corresponding to the two image subregions of the seam, the point cloud set $\Omega_3$ and the point cloud set $\Omega_4$ are divided every a distance of $l_4$ to generate the point cloud subset $\Omega_3{}^i$, i=1, 2, . . . , m and point cloud subset $\Omega_4{}^i$, i=1, 2, . . . , m, where m are the number of subsets contained in the point cloud set $\Omega_3$ and the point cloud set $\Omega_4$, and are also the number of sampling points.

The plane fitting is performed on all points in the point cloud subset $\Omega_3{}^i$ to obtain the plane $P_2$. The equation of the plane $P_2$ is $A_2x+B_2y+C_2z+D_2=0$. The distances from all points in the point cloud subset $\Omega_4{}^i$ to the plane $P_2$ is calculated and averaged to obtain the flush $\varepsilon_i$ of the seam.

$\varepsilon_i$ is the flush of the seam at the i-th sampling point; and $A_2$, $B_2$, $C_2$ and $D_2$ are the coefficients of the plane equation respectively.

The above steps are repeated for all subsets in the point cloud set $\Omega_3$ and the point cloud set $\Omega_4$ to obtain m flushes $\varepsilon_i$, i=1, 2, . . . , m of the seam.

As another embodiment of the present application, this embodiment is a further detailed supplement and explanation of the method for calculating the concave-convex amount on the rivet in the present application based on the above-mentioned embodiments.

As shown in FIG. 5, the method for calculating the concave-convex amount on the rivet includes:

Step S211, performing circle recognition in the collected two-dimensional image to obtain edge information of the rivet. Since the obtained two-dimensional image has obvious stripe characteristics, in order to better obtain the edge information of the rivet, the collected two-dimensional image can be pre-processed, that is, the collected two-dimensional image is averaged pixel by pixel, the stripe characteristics are eliminated, and the image of the real scene is obtained.

On this basis, the rivet edge is elliptical fitted, and is extended inward by a distance of $l_1$ to obtain the image subregion of the rivet, and the elliptical fitting result of the rivet edge is extended outward by a distance of $l_2$ to obtain the image subregion of the skin.

In the related art, Chinese Application Patent CN113129445A, published on Jul. 16, 2021, is proposed. This application uses the points in the cylinder corresponding to the rivet contour circle as the initial rivet point cloud. However, in actual applications, there are often pits at the center of the rivet, which will cause large errors. Compared with the patent document, this embodiment performs ellipse fitting on the edge of the rivet and extends the edge of the rivet inward by the distance $l_1$ to obtain the image subregion of the rivet, which can avoid the influence of the pits.

Step S212, according to the correspondence between the two-dimensional image and the three-dimensional point cloud, obtaining the point cloud set $\Omega_1$ of the rivet corresponding to the image subregion of the rivet and the point cloud set $\Omega_2$ of the skin corresponding to the image subregion of the skin.

Step S213, performing plane fitting on the point cloud set $\Omega_2$ of the skin to obtain the skin plane $P_2$. The equation of the skin plane is recorded as $A_1x+B_1y+C_1z+D_1=0$, then the formula for calculating the concave-convex amount on the rivet is:

$$\delta = \frac{\sum_{i=1}^{n} A_1 x_i + B_1 y_i + C_1 z_i + D_1}{n\sqrt{A_1^2 + B_1^2 + C_1^2}},$$

where $(x_i, y_i, z_i)$, $i=1, 2, \ldots, n$ is the point cloud coordinate, n is the total number of point clouds in the rivet point cloud set, $A_1$, $B_1$, $C_1$ and $D_1$ are the coefficients of the plane equation, and $\delta$ is the concave-convex amount on the rivet.

As another embodiment of the present application, this embodiment is a further supplement and explanation of the technical solution for planning three-dimensional measurement points according to the nail head and seam information in the aircraft digital model in the present application based on any of the above embodiments.

In this embodiment, the three-dimensional measurement points are planned according to the nail head and seam information in the aircraft digital model, and the two-dimensional image and three-dimensional point cloud information of the aircraft surface are obtained, as shown in FIG. 6, which includes the following steps.

Step S11, extracting normal vector information of each nail head in the measurement area, and calculating the normal vector of the measurement point after averaging.

Step S12, extracting the position information of each nail head in the measurement area, and offsetting the measurement distance $l_0$ along the average normal vector direction after averaging to obtain the position of the measurement point.

Step S13, extracting the direction information of the seam in the measurement area so that the direction vector of the measurement point forms an angle $\beta$ with the direction of the seam.

Step S14, taking the position and direction vector of the measurement point as the reference to perform measurement and obtaining the two-dimensional image and three-dimensional point cloud information of the aircraft surface.

As another embodiment of the present application, the present application includes a three-dimensional measurement system for key morphological features of an aircraft surface. The measurement system is a structured light measurement system, including a camera 1, a projector 2, and a drive assembly. In this embodiment, the specific structure of the drive assembly is not limited, as long as the drive assembly can be used to drive the camera 1 and the projector 2 to rotate in opposite directions at the same angle at the same time, to increase or decrease the measurement distance, and the center of the measurement range is always located on the perpendicular bisector of the optical center connection line of the camera 1 and the projector 2. For example, the drive assembly can be a motor that drives the camera 1 and the projector 2 to rotate respectively.

The measurement system can be used in any of the above embodiments. By measuring the measurement points in step S1, the two-dimensional image and three-dimensional point cloud information of the aircraft surface can be obtained. In addition, the measurement system can also be used alone for other measurement methods to obtain two-dimensional images and three-dimensional point cloud information of the inner and outer surfaces of the aircraft.

As another embodiment of the present application, this embodiment is a further detailed supplement and explanation of the drive assembly based on the above embodiment. When the drive assembly is a motor, not only can the effect not be further improved, but the cost is also increased. Therefore, this embodiment improves the drive assembly, and the drive assembly includes a camera gear 3, a projector gear 4, a camera rack 5, a projector rack 6 and a drive gear 7. The camera 1 and the projector 2 are respectively provided on the camera gear 3 and the projector gear 4. Initially, the angles between the optical axes of the camera 1 and the projector 2 and the horizontal direction are the same. The radius of the camera gear 3, the projector gear 4 and the drive gear 7 is the same. The camera rack 5 includes a first rack for meshing with the camera gear 3 and a second rack for meshing with the drive gear 7. The projector rack 6 includes a third rack for meshing with the projector gear 4 and a fourth rack for meshing with the drive gear 7. The second rack and the fourth rack are respectively located on both sides of the drive gear 7, and are used to drive the camera gear 3 and the projector gear 4 to rotate at the same angle in opposite directions under the drive of the drive gear 7, thereby driving the camera 1 and the projector 2 to rotate at the same angle in opposite directions to ensure the symmetry of the camera 1 and the projector 2.

At present, the surface structure of an aircraft is mainly made of skin, and most of the connections are made by rivets. In order to ensure the surface quality of the aircraft, it is very important to measure key morphological features such as concave-convex amount on the rivet, gap and flush of the seam. However, the measurement distance of the existing measurement system is fixed, which cannot meet the different requirements for the measurement distance of the outer and inner surfaces of the aircraft at the same time. Therefore, the existing detection methods can no longer meet the high requirements of advanced aircraft for surface quality. Therefore, this embodiment proposes a three-dimensional measurement method, system and use method of key morphological features of the aircraft surface. The measurement system can realize adjustable measurement distance and obtain three-dimensional point cloud information of the inner and outer surfaces of the aircraft. On this basis, measurement method can extract key morphological features such as concave-convex on the nail head, gap and flush of the seam with high precision, and can realize automation without human intervention.

This embodiment first explains the following professional terms.

Aircraft digital model: digital model of aircraft.

Figure 12:
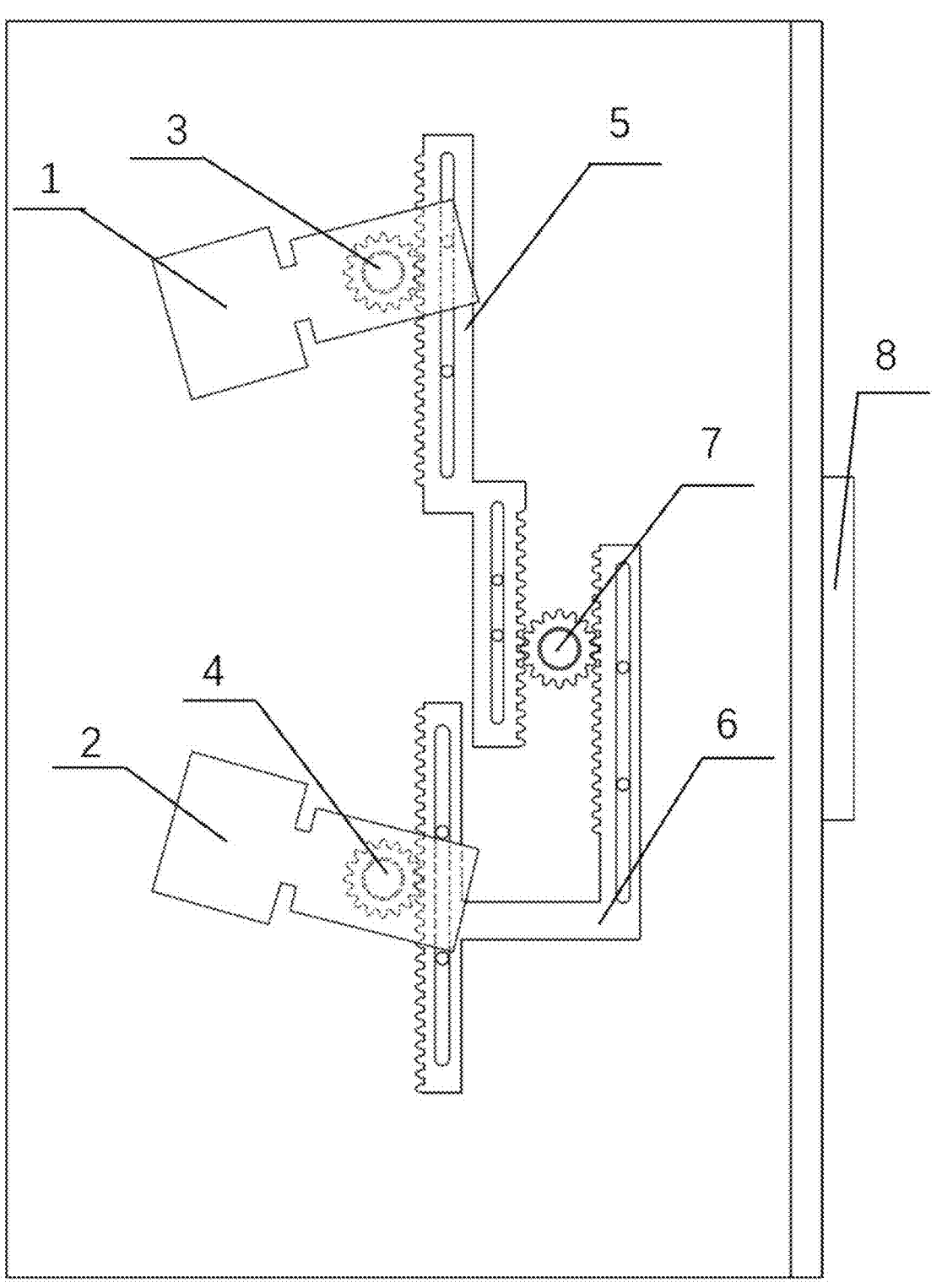
FIG. 12 is a schematic structural diagram of a measurement system according to the present application.

This embodiment proposes a three-dimensional measurement system for key morphological features of an aircraft surface, referring to FIG. 12, the measurement system includes a camera 1, a projector 2, a drive assembly and a mounting flange 8. The drive assembly includes a camera gear 3, a projector gear 4, a camera rack 5, a projector rack 6 and a drive gear 7. The camera 1 and the projector 2 are respectively provided on the camera gear 3 and the projector gear 4, and initially, the angles between the optical axes of the camera 1 and the projector 2 and the horizontal direction are the same. The camera 1 is used to take photos of the stripe pattern projected by the projector 2 onto the surface of the aircraft.

The camera gear 3, the projector gear 4 and the drive gear 7 have the same radius. The camera rack 5 includes a first rack for meshing with the camera gear 3 and a second rack for meshing with the drive gear 7. The projector rack 6 includes a third rack for meshing with the projector gear 4 and a fourth rack for meshing with the drive gear 7. The second rack and the fourth rack are respectively located on both sides of the drive gear 7, and the first rack and the third rack can be located on the same vertical line.

When the measuring distance is changed, the camera gear 3 and the projector gear 4 are driven by the corresponding rack and the drive gear 7 to rotate in the opposite direction at the same angle, thereby driving the camera 1 and the projector 2 to rotate in the opposite direction at the same angle to maintain their symmetry, and obtaining the maximum public field of view. At the same time, rotating at the same angle can ensure that the center of the measuring range is always located on the perpendicular bisector of the optical center of the camera 1 and the projector 2, so that the system does not need to consider the change of the measuring range when changing the measuring distance in practical applications.

After the measuring distance is changed, the camera 1 and the projector 2 are defocused. At this time, the mechanical adjustable focus lens installed on the camera 1 and the projector 2 is adjusted to adjust the focal length according to the measuring distance.

The angles of camera 1 and projector 2 after rotation are accurately obtained through the angle encoders installed on the camera gear 3 and the projector gear 4. The angle information can be used to calculate the external parameter matrix of camera 1 and projector 2 for point cloud acquisition.

When measuring the exterior of the aircraft, the camera 1 and the projector 2 are driven to rotate away from each other, that is, the camera 1 rotates clockwise and the projector 2 rotates counterclockwise, to increase the measurement distance, increase the measurement area and improve the safety during measurement to avoid collision with the aircraft. When measuring the narrow space inside the aircraft, the camera 1 and the projector 2 are driven to rotate towards each other, that is, the camera 1 rotates counterclockwise and the projector 2 rotates clockwise, to reduce the measurement distance and adapt to the narrow space inside the aircraft.

When it is necessary to reduce the measuring distance, the drive gear 7 rotates. Assume that the radius of the drive gear 7 is R (taken as 10 mm in this embodiment). When the drive gear 7 rotates clockwise by an angle of θ (taken as 5° in this embodiment), the upward displacement of the camera rack 5 is:

$$R_\theta = 10 \cdot \frac{5}{180} \cdot \pi = 0.873,$$

and the downward displacement of the projector rack 6 is:

$$R_\theta = 10 \cdot \frac{5}{180} \cdot \pi = 0.873,$$

thereby driving the gears fixed to the camera 1 and the projector 2 to rotate. The unit of $R_\theta$ is mm.

Since the camera gear 3 and the projector gear 4 have the same radius as the drive gear 7 (10 mm), the camera gear 3 rotates counterclockwise by an angle of θ (5°) and the projector gear 4 rotates clockwise by an angle of θ (5°). To ensure the maximum measurement range, the measurement plane is taken at the intersection of the optical axes of the camera 1 and the projector 2. Assuming that the angles between the optical axes of the camera 1 and the projector 2 and the horizontal direction are both α (taken as 10° in this embodiment), and the distance between the optical centers of the camera 1 and the projector 2 is h (taken as 150 mm in this embodiment), the change in the measured distance is:

$$
\begin{aligned}
\Delta L &= \frac{h}{2\tan\alpha} - \frac{h}{2\tan(\alpha+\theta)} \\
&= \frac{150}{2\cdot\tan(10°)} - \frac{150}{2\cdot\tan(10°+5°)} \\
&= 425.3 - 279.9 \\
&= 145.4
\end{aligned}
$$

Where $$L_1 = \frac{h}{2\tan\alpha} = 425.3$$

is the initial measurement distance, $$L_2 = \frac{h}{2\tan(\alpha+\theta)} = 279.9$$

is the reduced measurement distance, and the units of $\Delta L$, $L_1$ and $L_2$ are all mm. When it is necessary to increase the measurement distance, the drive gear 7 needs to be rotated counterclockwise in the same way. Based on the above measurement system, this embodiment also proposes an automated three-dimensional measurement method for key morphological features of an aircraft surface, referring to FIG. 2, which mainly includes the following steps.

Step S1, planning the three-dimensional measurement points according to the nail head and seam information in the aircraft digital model, and obtaining the two-dimensional image and three-dimensional point cloud information of the aircraft surface, which include the following steps.

Step S11, extracting the normal vector information of each nail head in the measurement area, and calculating the normal vector of the measurement point after averaging.

Step S12, extracting the position information of each nail head in the measurement area, and offsetting the measurement distance/o along the average normal vector direction after averaging to obtain the position of the measurement point. The measurement distance $l_0$ is set according to the requirements of the three-dimensional measurement system, generally 200 mm to 1000 mm, and is set to 425.3 mm in this embodiment.

Step S13, extracting the direction information of the seam in the measurement area so that the direction vector of the measurement point forms an angle β with the seam. The angle β ranges from 3° to 20°, and is 10° in this embodiment.

Step S14, based on the position and direction vector of the measurement point, performing measuring, by the measurement system, to obtain the two-dimensional image and three-dimensional point cloud information of the aircraft surface.

Step S2, automatically identifying and extracting the position information of the rivet and the seam in the two-dimensional image, and using the correspondence between the two-dimensional image and the three-dimensional point cloud to obtain the point clouds corresponding to the rivet and the seam, and calculating the concave-convex amount on the rivet, and the flush and gap of the seam.

The two-dimensional image obtained by the measurement system has obvious stripe features. All the collected images are averaged, the stripe features are eliminated, and the image of the real scene is obtained, as shown in FIG. 7, which is used for the identification of rivets and seams.

The method for calculating the concave-convex amount on the rivet includes the following steps.

Figure 8:
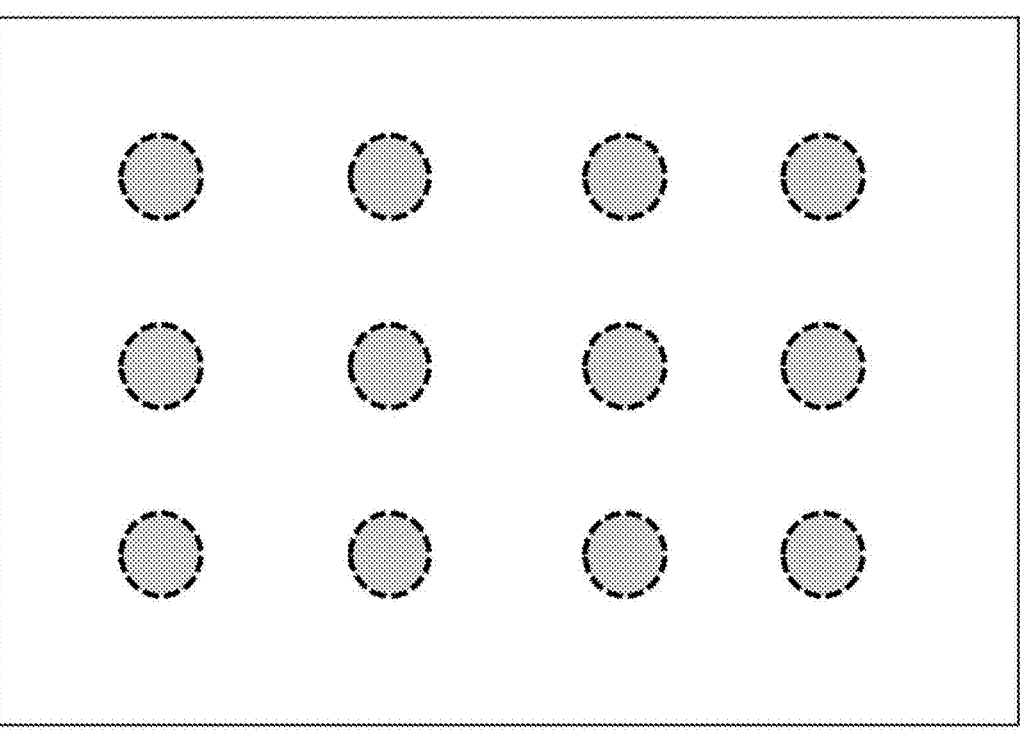
FIG. 8 is a schematic diagram of a result for extracting a rivet edge according to the present application.
Figure 9:
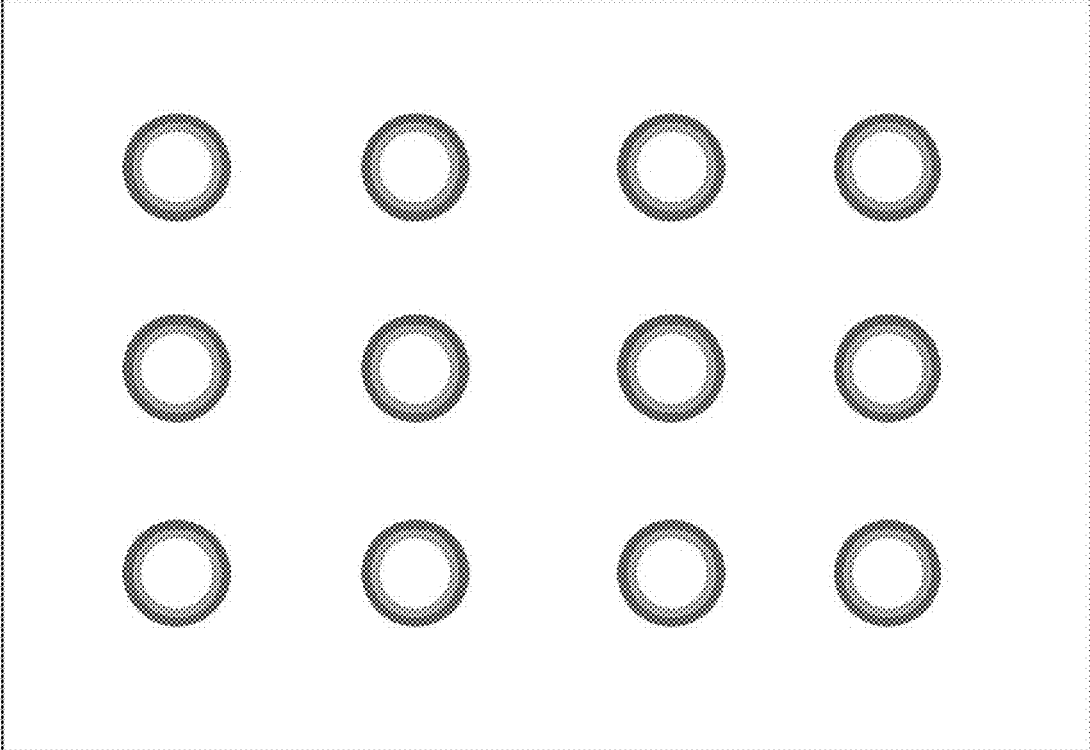
FIG. 9 is a schematic diagram of results for extracting an image subregion of the rivet and an image subregion of a skin according to the present application.

Step S211, since the rivet has obvious circular features, circle recognition is performed in the collected two-dimensional image. Based on the grayscale difference, Canny operator edge detection is performed to obtain the edge information of the rivet, as shown in FIG. 8. The ellipse fitting is performed for the rivet edge, and the rivet edge is extended inward by a distance of $l_1$ to obtain the image subregion of the rivet. The ellipse fitting result of the rivet edge is extended outward by a distance of $l_2$ to obtain the image subregion of the skin, and the result is shown in FIG. 9. The distance needs to be less than the rivet radius, and the value in this embodiment is 2 mm. The range of the distance is 1.5 mm to 5 mm, and the value in this embodiment is 2 mm.

Step S212, according to the correspondence between the two-dimensional image and the three-dimensional point cloud, obtaining the rivet point cloud set $\Omega_1$ corresponding to the image subregion of the rivet and the skin point cloud set $\Omega_2$ corresponding to the image subregion of the skin.

Step S213, performing plane fitting on the skin point cloud set $\Omega_2$ to obtain the skin plane $P_1$. The equation of the skin plane is recorded as $A_1x+B_1y+C_1z+D_1=0$, then the method for calculating the concave-convex amount on the rivet is:

$$\delta = \frac{\sum_{i=1}^{n} A_1 x_i + B_1 y_i + C_1 z_i + D_1}{n\sqrt{A_1^2 + B_1^2 + C_1^2}}$$

$(x_i, y_i, z_i)$, $i=1, 2, \ldots, n$ is the point cloud coordinate, n is the total number of point clouds in the rivet point cloud set, $A_1$, $B_1$, $C_1$, and $D^1$ are the coefficients of the plane equation, and $\delta$ is the concave-convex amount on the rivet.

Referring to FIG. 3 and FIG. 4, the method for calculating the flush and gap of the seam specifically includes the following steps.

Figures 10, 11:
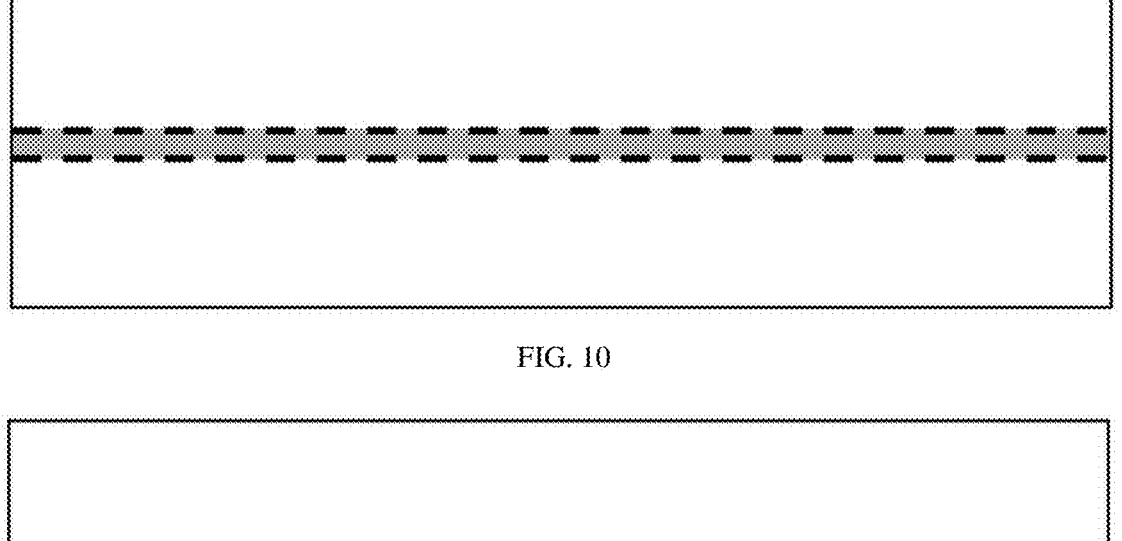
FIG. 10 is a schematic diagram of the result for extracting the seam edge according to the present application.
FIG. 11 is a schematic diagram of the result for extracting a seam subregion according to the present application.

Step S221, since the seam is close to a straight line feature in the image, a straight line fitting is performed in the two-dimensional image collected in step S1: using the Canny operator to perform edge detection to obtain the edge information of the seam, and using the length and continuity to screen, and performing a straight line fitting to obtain two edge lines of the seam. The result is shown in FIG. 10. The two edge lines are extended outward by a distance of $l_3$ respectively to obtain two image subregions of the seam, and the result is shown in FIG. 11. The value range of the distance is 3 mm to 10 mm, and the value in this embodiment is 5 mm.

Step S222, according to the correspondence between the two-dimensional image and the three-dimensional point cloud, obtaining the point cloud set $\Omega_3$ and the point cloud set $\Omega_4$ corresponding to the two image subregions of the seam.

Step S223, since the seam is usually long, and the flush and the gap of the seam vary everywhere. In order to measure the flush and the gap of the seam more precisely, the point cloud set $\Omega_3$ and the point cloud set $\Omega_4$ are divided every distance $l_4$ to generate the point cloud subset $\Omega_3^i$, i=1, 2, . . . , m and the point cloud subset $\Omega_4^i$, i=1, 2, . . . , m, wherein m is the number of subsets contained in the point cloud set $\Omega_3$ and the point cloud set $\Omega_4$, and also the number of sampling points.

For the corresponding point cloud subset $\Omega_3$ and point cloud subset $\Omega_4$, the gap of the seam is calculated. Due to the limited density of the three-dimensional point cloud, the accuracy of directly calculating the distance between the point cloud in the point cloud subset $\Omega_3^i$ and the point cloud in the point cloud subset $\Omega_4^i$ is limited by the density of the point cloud. Here, the super-resolution method is used to improve the measurement accuracy of the seam. Since the measurement direction is deflected by an angle of $\beta$ compared to the seam direction when measuring the point cloud in step S1, the positional relationship between the measured point cloud and the seam is shown in FIG. 1. Assuming that the distance between adjacent points of the measured point cloud in step S1 is $d_0$, and the divided distance $l_4$ is required to be greater than $$\frac{d_0}{\sin \beta}$$

here. Specifically, the value range of the divided distance $l_4$ is 20 mm to 50 mm, and the value in this embodiment is 30 mm.

After the above processing, the flush and the gap of the seam are calculated, and there is no requirement for the calculation order of the flush and the gap of the seam.

The method for calculating the gap of the seam is as follows:

calculating the flush of the seam for the corresponding point cloud subset $\Omega_3^i$ and point cloud subset $\Omega_4^i$: performing plane fitting on all points in the point cloud subset $\Omega_3^i$ to obtain the plane $P_2$, recording the equation of the plane as $A_2x+B_2y+C_2z+D_2=0$, calculating the distances from all points in the point cloud subset $\Omega_4^i$ to the plane $P_2$ and averaging the distances to obtain the flush $\varepsilon_i$ of the seam. $\varepsilon_i$ is the flush of the seam at the i-th sampling point; and $A_2$, $B_2$, $C_2$ and $D_2$ are the coefficients of the plane equation respectively.

The above steps are repeated for all subsets in the point cloud set $\Omega_3$ and the point cloud set $\Omega_4$ to obtain m flushes of the seam $\varepsilon_j$, i=1, 2, . . . , m.

The method for calculating the gap of the seam is as follows:

calculating the shortest distance between the point cloud in the point cloud subset $\Omega_3^i$ and the point cloud in the point cloud subset $\Omega_4^i$ in the x direction, that is, the direction perpendicular to the seam. That is, taking the x coordinate $x_1$ of the point with the largest x coordinate in the point cloud subset $\Omega_3^i$ on the left side of the seam and the x coordinate $x_2$ of the point with the smallest x coordinate in the point cloud subset $\Omega_4^i$ on the right side of the seam, then the method for calculating the gap of the seam is:

$$d_i = x_2 - x_1.$$

Wherein $d_i$ is the gap of the seam at the i-th sampling point.

The above steps are repeated for all subsets in the point cloud set $\Omega_3$ and the point cloud set $\Omega_4$ to obtain m gaps of the seams $d_i$, i=1, 2, . . . , m.

In summary, the technical advancement of the present application is reflected in the following points.

Existing technologies, such as Chinese Application Patents CN114626470A, CN111028221A, CN111814888A, CN112053361A and CN114627177A, cannot overcome the limitation of point cloud density, and cannot reduce the error caused by insufficient point cloud density, resulting in large errors in gap measurement. However, the present application innovatively proposes that when measuring the point cloud, the measuring direction is offset from the seam direction by a small angle, and then the nearest point in the point cloud on both sides that is perpendicular to the seam is found to obtain the gap of the seam. This allows the present application to get rid of the limitation of point cloud resolution and greatly reduce the error caused by insufficient point cloud density.

In the related art, the relative position of the camera and the projector generally does not change, but the two move as a whole; or the camera and the projector are adjusted separately; or the camera or the projector is adjusted. The above technical solutions all have the problem of needing to readjust the measurement range, resulting in low measurement efficiency and complicated operation.

On the contrary, in the present application, by changing the angle between the camera and the projector, the camera and the projector are rotated in the opposite direction by the same angle, which can ensure that the center of the measurement range is always located on the perpendicular bisector of the optical center line of the camera and the projector, so that the measurement system can meet different requirements for measurement distance in practical applications, and there is no need to consider the change of the measurement range when changing the measurement distance.

The technical solution of the present application can realize the digital measurement of key morphological features of the aircraft surface, replacing the traditional manual measurement and paper transmission of measurement data, significantly improving the measurement efficiency and accuracy, and providing technical support for improving the quality of nail heads and seams on the aircraft surface. At the same time, combined with industrial robots, it can complete the measurement of nail heads and seams on the surface of the entire machine, thus laying the foundation for the closed loop of key performance such as aircraft aerodynamic performance. In addition, this technology can be promoted and applied to the aerospace and automotive fields to improve the quality of related products.

In summary, after reading the present application, various other corresponding transformation solutions made by those skilled in the art based on the technical solutions and technical concept of the present application without creative efforts, are all fall within the scope of the present application.

What is claimed is:

1. A three-dimensional measurement method for a key morphological feature on an aircraft surface, implemented by a structured-light measurement system comprising a camera, a projector, and a drive component, the method comprising:

step S1, planning a three-dimensional measurement point according to information of a rivet and a seam in an aircraft digital model, and obtaining information of a two-dimensional image and a three-dimensional point cloud of the aircraft surface, wherein a direction vector of the measurement point forms an angle $\beta$ with a seam direction; and step S2, automatically identifying and extracting position information of the rivet and the seam in the two-dimensional image, and obtaining point clouds corresponding to the rivet and the seam according to correspondence between the two-dimensional image and the three-dimensional point cloud to calculate a concave-convex amount on the rivet, and a gap and a flush of the seam, wherein a method for calculating the gap of the seam comprises:

finding a nearest point in point clouds on both sides of the seam in a direction perpendicular to the seam to obtain the gap of the seam, wherein the step S1 comprises:

step S11, extracting normal vector information of each nail head in a measurement area, and calculating a normal vector of a measurement point after averaging;

step S12, extracting position information of each nail head in the measurement area, and offsetting a measurement distance of $l_0$ along an average normal vector direction after averaging to obtain a position of the measurement point;

step S13, extracting direction information of the seam in the measurement area, so that a direction vector of the measurement point forms an angle $\beta$ with a seam direction; and step S14, taking the position and direction vector of the measurement point as a reference to perform measurement and obtaining information of the two-dimensional image and the three-dimensional point cloud of the aircraft surface.

2. The three-dimensional measurement method of claim 1, wherein the method for calculating the gap of the seam in the step S2 comprises:

step S221, obtaining two edge lines of the seam according to a collected two-dimensional image, and extending the two edge lines outward by a distance of $l_3$ to obtain two image subregions of the seam;

step S222, obtaining a point cloud set $\Omega_3$ and a point cloud set $\Omega_4$ corresponding to the two image subregions of the seam according to the correspondence between the two-dimensional image and the three-dimensional point cloud; and step S223, calculating a shortest distance between a point cloud in the point cloud set $\Omega_3$ and a point cloud in the point cloud set $\Omega_4$ in an x direction to calculate the gap of the seam, wherein the x direction is a direction perpendicular to the seam.

3. The three-dimensional measurement method of claim 2, wherein the step S223 comprises:

taking an x coordinate $x_1$ of a point with a largest x coordinate in the point cloud set $\Omega_3$ on a left side of the seam and an x coordinate $x_2$ of a point with a smallest x coordinate in the point cloud set $\Omega_4$ on a right side of the seam, then the method for calculating the gap of the seam is as follows:

$$d_i = x_2 - x_1;$$

wherein $d_i$ is the gap of the seam at an i-th sampling point.

4. The three-dimensional measurement method of claim 2, wherein the step S223 comprises:

dividing the point cloud set $\Omega_3$ and the point cloud set $\Omega_4$ every distance of $l_4$ to generate a point cloud subset $\Omega_3^i$, $i=1, 2, \ldots, m$ and a point cloud subset $\Omega_4^i$, $i=1, 2, \ldots, m$, wherein m is a number of subsets contained in the point cloud set $\Omega_3$ and the point cloud set $\Omega_4$; and calculating a shortest distance between a point cloud in the point cloud subset $\Omega_3^i$ and a point cloud in the point cloud subset $\Omega_4^i$ in an x direction, that is, taking an x coordinate $x_1$ of a point with a largest x coordinate in the point cloud subset $\Omega_3{}^i$ on a left side of the seam and an x coordinate $x_2$ of a point with a smallest x coordinate in the point cloud subset $\Omega_4{}^i$ on a right side of the seam, then the method for calculating the gap of the seam gap is as follows:

$$d_i = x_2 - x_1;$$

wherein $d_i$ is the gap of the seam at an i-th sampling point; repeating above steps for all subsets in the point cloud set $\Omega_3$ and the point cloud set $\Omega_4$ to obtain m gaps $d_i$, i=1, 2, . . . , m of the seams.

5. The three-dimensional measurement method of claim 4, wherein the distance $l_4$ is greater than $$\frac{d_0}{\sin \beta},$$

where $d_0$ is a distance between adjacent points of the point clouds for measurement, and $\beta$ is an angle formed by a direction vector of a point for measurement and a seam direction.

6. The three-dimensional measurement method of claim 2, wherein obtaining the two edge lines of the seam comprises:

using a Canny operator to perform edge detection to obtain edge information of the seam;

using length and continuity to screen, and performing straight line fitting to obtain the two edge lines of the seam.

7. The three-dimensional measurement method of claim 1, wherein a method for calculating the flush of the seam comprises:

step S231, obtaining two edge lines of the seam according to a collected two-dimensional image, and extending the two edge lines outward by a distance of $l_3$ to obtain two image subregions of the seam;

step S232, obtaining a point cloud set $\Omega_3$ and a point cloud set $\Omega_4$ corresponding to the two image subregions of the seam according to the correspondence between the two-dimensional image and the three-dimensional point cloud; and step S233, performing plane fitting on all points in the point cloud set $\Omega_3$ to obtain a plane, calculating distances from all points in the point cloud set $\Omega_4$ to the plane and averaging the distances to obtain the flush $\varepsilon_i$ of the seam, wherein $\varepsilon_i$ is the flush of the seam at an i-th sampling point.

8. The three-dimensional measurement method of claim 7, wherein the step S233 comprises:

dividing the point cloud set $\Omega_3$ and the point cloud set $\Omega_4$ every distance of $l_4$ to generate a point cloud subset $\Omega_3{}^i$, i=1, 2, . . . , m and a point cloud subset $\Omega_4{}^i$, i=1, 2, . . . , m, wherein m is a number of subsets contained in the point cloud set $\Omega_3$ and the point cloud set $\Omega_4$;

performing plane fitting on all points in the point cloud subset $\Omega_3{}^i$ to obtain a plane $P_2$, wherein an equation for the plane $P_2$ is recorded as $A_2x + B_2y + C_2z + D_2 = 0$, and calculating distances from all points in the point cloud subset $\Omega_4{}^i$ to the plane $P_2$ and averaging the distances to obtain the flush Et of the seam, wherein $\varepsilon_i$ is the flush of the seam at the i-th sampling point, and $A_2$, $B_2$, $C_2$ and $D_2$ are coefficients of the equation of the plane respectively; and repeating above steps for all subsets in the point cloud set $\Omega_3$ and the point cloud set $\Omega_4$ to obtain m flushes $\varepsilon_i$, i=1, 2, . . . , m of the seams.

9. The three-dimensional measurement method of claim 1, wherein the step S2 further comprises:

preprocessing the two-dimensional image, that is, averaging the collected two-dimensional image pixel-by-pixel.

10. The three-dimensional measurement method of claim 1, wherein the method for calculating the concave-convex amount on the rivet in the step S2 comprises:

step S211, performing circle recognition in the collected two-dimensional image to obtain edge information of the rivet, performing ellipse fitting on the rivet edge and extending the rivet edge inward by a distance of $l_1$ to obtain an image subregion of the rivet, and extending a result of the ellipse fitting of the rivet edge outward by a distance of $l_2$ to obtain an image subregion of a skin;

step S212, according to the correspondence between the two-dimensional image and the three-dimensional point cloud, obtaining a rivet point cloud set $\Omega_1$ corresponding to the image subregion of the rivet and a skin point cloud set $\Omega_2$ corresponding to the image subregion of the skin; and step S213, performing plane fitting on the skin point cloud set $\Omega_2$ to obtain a skin plane $P_1$, wherein an equation of the skin plane is $A_1x + B_1y + C_1z + D_1 = 0$, then the method for calculating the concave-convex on the rivet is as follows:

$$\delta = \frac{\sum_{i=1}^{n} A_1 x_i + B_1 y_i + C_1 z_i + D_1}{n\sqrt{A_1^2 + B_1^2 + C_1^2}},$$

wherein $(x_i, y_i, z_i)$, i=1, 2, . . . , n is a point cloud coordinate, n is a total number of point clouds in the rivet point cloud set, $A_1$, $B_1$, $C_1$ and $D_1$ are coefficients of the equation of the plane, and $\delta$ is the concave-convex on the rivet.

11. A three-dimensional measurement system for a key morphological feature on an aircraft surface, applied to the three-dimensional measurement method for the key morphological feature on the aircraft surface of claim 1 to obtain information of a two-dimensional image and a three-dimensional point cloud of the aircraft surface, the measurement system comprising:

a camera;

a projector; and a drive component configured to drive the camera and the projector to rotate in opposite directions at a same angle simultaneously, to increase or decrease a measurement distance, wherein a center of a measurement range is always located on a perpendicular bisector of a line connecting optical centers of the camera and the projector.

12. The three-dimensional measurement system of claim 11, wherein:

the drive component comprises a camera gear, a projector gear, a camera rack, a projector rack and a drive gear;

the camera and the projector are respectively provided at the camera gear and the projector gear;

the camera gear, the projector gear and the drive gear have a same radius;

the camera rack comprises a first rack for meshing with the camera gear and a second rack for meshing with the drive gear;

the projector rack comprises a third rack for meshing with the projector gear and a fourth rack for meshing with the drive gear; and the drive gear rotates to simultaneously drive the second rack and the fourth rack to move in an opposite direction, to further drive the camera gear and the projector gear to rotate in an opposite direction at a same angle simultaneously, thereby driving the camera and the projector to rotate in an opposite direction at a same angle simultaneously, for adjusting a measurement distance.

13. The three-dimensional measurement system of claim 12, wherein initially, angles between optical axes of the camera and the projector and a horizontal direction are the same.

14. The three-dimensional measurement system of claim 12, wherein angle encoders are installed on the camera gear and the projector gear.

15. The three-dimensional measurement system of claim 11, wherein lenses installed on the camera and the projector are both mechanical zoom lenses.

16. A method for using the three-dimensional measurement system for the key morphological feature on the aircraft surface of claim 11, wherein when measuring an exterior of an aircraft, a camera and a projector are driven to rotate in directions away from each other simultaneously to increase a measurement distance; when measuring a narrow space inside the aircraft, the camera and the projector are driven to rotate in directions close to each other simultaneously to reduce a measurement distance.

* * * * *